United States Patent [19]
Seifert

[11] Patent Number: 5,984,422
[45] Date of Patent: Nov. 16, 1999

[54] INBOARD MOUNTED WHEEL END DISCONNECT UNIT

[75] Inventor: John R. Seifert, White Lake, Mich.

[73] Assignee: Bosch Braking Systems, Farmington Hills, Mich.

[21] Appl. No.: 08/904,478

[22] Filed: Jul. 31, 1997

[51] Int. Cl.⁶ ................................................ B60B 27/00
[52] U.S. Cl. .................................. 301/105.1; 192/69.41; 192/69.1
[58] Field of Search ...................... 301/105.1; 192/69.41, 192/69.9

[56] References Cited

U.S. PATENT DOCUMENTS

| | | |
|---|---|---|
| 4,893,960 | 1/1990 | Beier et al. . |
| 4,960,192 | 10/1990 | Kurihara ................................ 192/67 R |
| 5,141,088 | 8/1992 | Kurihara et al. ....................... 192/67 R |
| 5,219,054 | 6/1993 | Teraoka .................................. 192/67 R |
| 5,353,890 | 10/1994 | Clohessy .................................. 180/247 |
| 5,366,300 | 11/1994 | Deane et al. . |
| 5,443,316 | 8/1995 | Deane et al. . |
| 5,535,869 | 7/1996 | Bigley et al. ......................... 192/69.41 |
| 5,586,632 | 12/1996 | Bigley et al. ......................... 192/69.41 |
| 5,740,895 | 4/1998 | Bigley .................................. 192/69.41 |
| 5,772,285 | 6/1998 | Bigley et al. ............................ 301/6.8 |

Primary Examiner—D. Glenn Dayoan
Assistant Examiner—Long Bao Nguyen
Attorney, Agent, or Firm—Harness, Dickey & Pierce, PLC

[57] ABSTRACT

A wheel assembly having an outer stem of a constant velocity joint selectively providing rotational drive torque to a hub at an inboard edge of the hub. The hub is retained by an inboard retention device which also acts to engage an engagement ring used to provide the driving torque to the hub. The preload on the bearings used to support the hub within the steering knuckle of the present invention is not determined by the forces provided by the inboard retainer, but instead are established by interaction between the inner races alone or by the inner races in combination with a tone ring used with an ABS or speed sensing traction control type system.

15 Claims, 5 Drawing Sheets

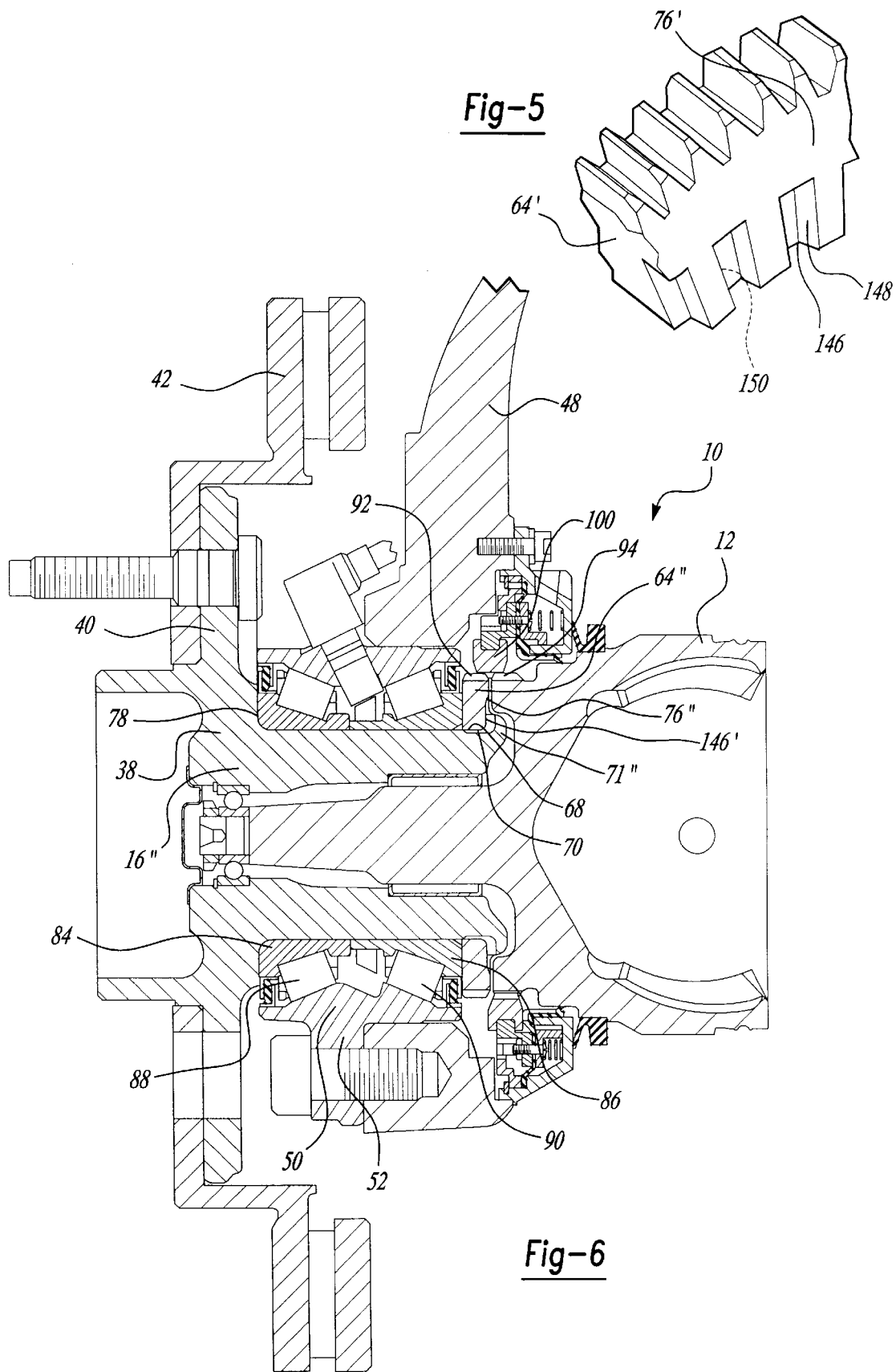

INBOARD MOUNTED WHEEL END DISCONNECT UNIT

BACKGROUND OF THE INVENTION

1. Technical Field

This invention generally relates to motor vehicle wheel assemblies and, more particularly, to an inboard rotational drive engagement and bearing system used in conjunction with a spindle having inboard retention.

2. Discussion

Presently most vehicle wheel assemblies used in conjunction with wheels that are driven, or selectively driven, utilize devices to retain the hub which are accessed from the outboard end of the wheel hub, and are therefore referred to as "outboard retention" devices. The hub typically provides for mounting of a wheel as well as mounting of a brake disc rotor at an outboard region. The outboard retention device is tightened to a specified range which controls the preload on bearings which support the hub relative to the steering knuckle or other non-rotating portions of the wheel assembly. A disadvantage of conventional outboard retention devices retaining the hub to the wheel assembly and establishing the preload on the bearings is that there is axial run out or end play inherent in the system. The axial run out is a result of the fact that there is an upper limit to the bearing preload which can be established and still allow the bearings to function properly. This upper limit still allows variation in the axial position of the hub and attached rotor. Axial run out is a disadvantage because of the variation in inboard/outboard position that the brake disc rotor has relative to the brake pads which are typically positioned on the inboard and outboard sides of the disc.

Further, it is presently convention within the industry to provide driving rotational torque to the hub of the wheel assembly at its outboard end. By transferring the torque to the outboard edge of the hub there is a requirement that the axle, spindle, or outer stem which transfers the torque be of significantly greater structure than if the torque were transferred at the inboard edge of the hub. Since it is beneficial to reduce the weight of the vehicle to improve fuel economy and performance, and it is particularly beneficial to reduce the unsprung weight of the vehicle suspension because of the additional benefit to handling and response, it is a significant advantage to provide rotational driving forces to the inboard edge of the hub.

The present invention overcomes several of the disadvantages indicated above, and utilizes the advantages to provide a robust vehicle wheel assembly having inboard rotational drive engagement and inboard retention.

SUMMARY OF THE INVENTION

In accordance with the teachings of the present invention, there is provided a wheel assembly having an outer stem of a constant velocity joint selectively providing rotational drive torque to a hub at an inboard edge of the hub. The hub is retained by an inboard retention device which also acts to engage an engagement ring used to provide the driving torque to the hub. The preload on the bearings used to generally support the hub within the steering knuckle of the present invention is not determined by the forces provided by the inboard retainer, but instead are established by interaction between the inner races alone or by the inner races in combination with a tone ring used with an ABS or speed sensing traction control type system.

In accordance with the teachings of the first embodiment of the present invention, the engagement ring is splined onto an inboard portion of the hub and is retained by an inboard retainer exerting a force on an inboard radial face of the engagement ring. The inboard retainer is further secured by cold forming a portion of the hub to prevent disengagement. An outboard radial surface of the engagement ring exerts an axial force on a unit or flange bearing which establishes the predetermined preload on the bearing.

In accordance with the teachings of a second embodiment of the present invention, the unit or flange bearing of the first embodiment is replaced with two bearing sets which position a tone ring between the inner races of the bearing sets. The predetermined preload on the bearings is established by the contact between the outboard inner race, the tone ring, and the inboard inner race being axially forced into contact with one another between an outboard shoulder surface of the hub and the outboard radial surface of the engagement ring.

In accordance with the teachings of a third embodiment of the present invention, the inboard retention of the engagement ring is provided by cold forming an inboard portion of the hub to provide an axial load to the engagement ring. The rotational drive engagement being provided by splines on the hub and the engagement ring.

In accordance with the teachings of a fourth embodiment of the present invention, the inboard retention of the hub provides both axial and rotational engagement with the engagement ring on the inboard radial surface of the engagement ring.

In accordance with the teachings of a fifth embodiment of the present invention, inboard retention of the hub is provided by cold forming an inboard portion of the hub which engages the engagement ring thereby providing axial retention and some rotational engagement with the engagement ring, additional rotational drive engagement with the engagement ring being provided by a splined surface on the hub and engagement ring.

BRIEF DESCRIPTION OF THE DRAWINGS

The various advantages of the present invention will become apparent to one skilled in the art upon reading the following specification and by reference to the drawings in which:

FIG. 5 is a partial perspective view of an engagement ring shown in FIGS. 4 and 6;

FIG. 6 is a vertical cross-section through a fifth preferred embodiment of a wheel assembly made in accordance with the teachings of the present invention.

DETAILED DESCRIPTION OF THE PREFERRED EMBODIMENT

The following description of the preferred embodiment is merely exemplary in nature and is in no way intended to limit the invention or its application or uses. In describing the several embodiments of the present invention, common elements will be identified by common reference numbers in the figures.

Figure 1:
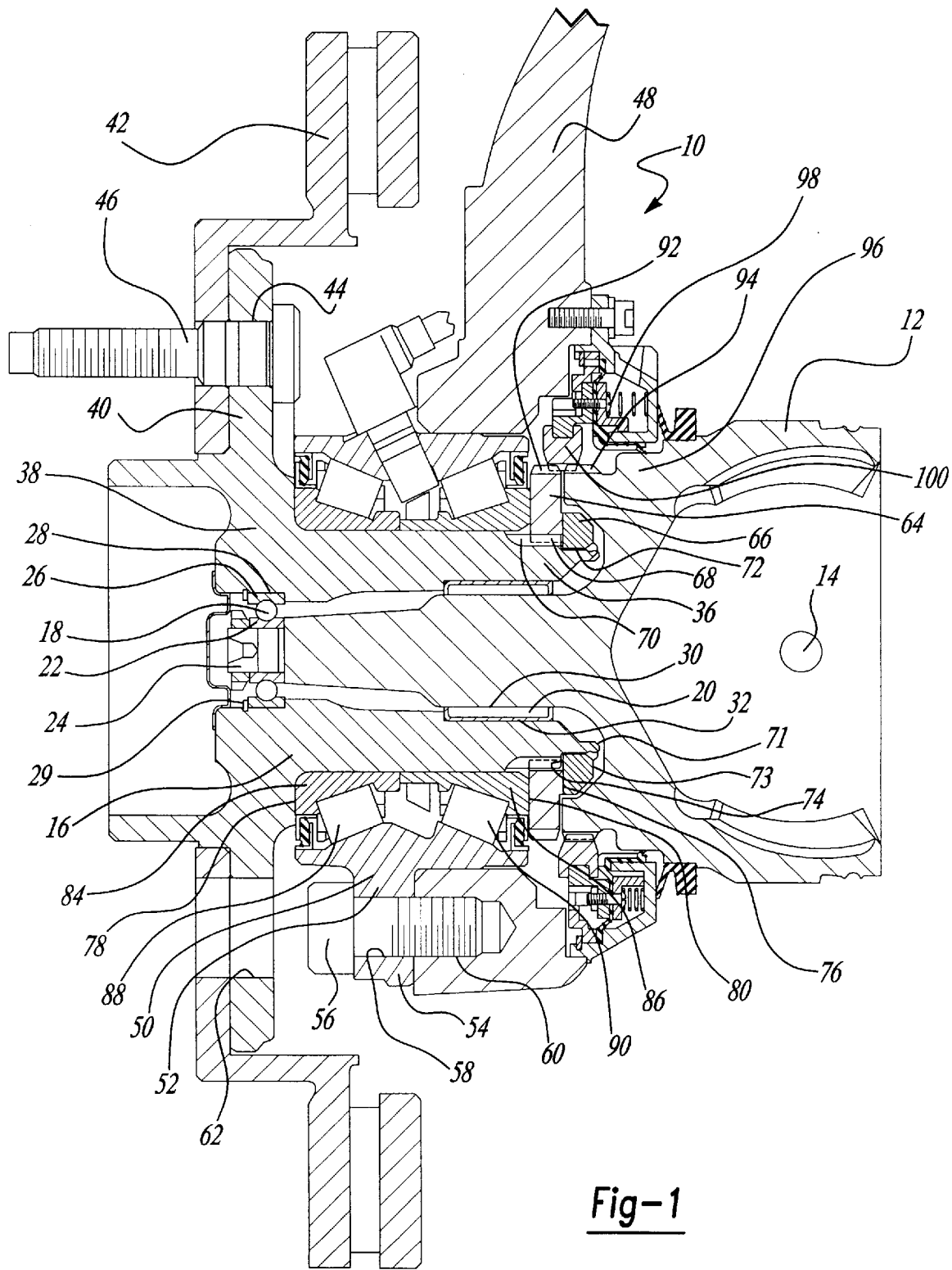
FIG. 1 is a vertical cross-section through a first preferred embodiment of a wheel assembly made in accordance with the teachings of the present invention.

Referring now to the drawings, a portion of a vehicle wheel assembly is generally illustrated in FIG. 1 and designated at 10. The assembly 10 illustrates common features of vehicle wheel assemblies, as well as one of the preferred embodiments of the present invention, as might be used with the front wheels of a four wheel drive vehicle. Wheel assembly 10 includes an outer stem 12 attached at an axially inner location 14 to a constant velocity joint (not shown). Outer stem 12 is journally supported within hub 16 by outer bearings 18 and inner bearings 20. Outer bearings 18 are typically ball bearings having an inner race 22 affixed to an axially outer end 24 of outer stem 12, and an outer race 26 press-fit to a radially inner recess 28 of hub 16. A retainer clip 29 is used to capture outer race 26 within radially inner recess 28. Inner bearings 20 are typically roller bearings contacting a radially outer surface 30 of outer stem 12 and a radially inner surface 32 of hub 16. As such, outer stem 12 is allowed to freely rotate about a common axis with hub 16.

Hub 16 is generally a cylindrical body having an inboard portion 36 and an outboard portion 38 from which wheel mounting flange 40 extends radially outward. Flange 40 provides for mounting of brake disc rotor 42 by fasteners (not shown). Flange 40 also includes a number of equidistantly spaced apertures 44 which receive wheel mounting studs 46 that allow a wheel (not shown) to be mounted to wheel assembly 10.

Hub 16 is generally supported within steering knuckle 48 of wheel assembly 10 by a unit or flange bearing 50. An outer race 52 of bearing 50 includes a radially extending attachment flange 54. Flange 54 is connected to steering knuckle 48 by a plurality of retention bolts 56 passing through apertures 58 in flange 54 and threadingly engaging bores 60 in steering knuckle 48. One or more clearance passages 62 are provided in wheel mounting flange 40 and brake disc rotor 42 which allow for the installation of retention bolts 56. While not shown, it will be readily understood by those skilled in the art that steering knuckle 48 provides pivotal connections to the suspension system of the vehicle to which wheel assembly 10 is attached. The pivotal connections create a generally vertical axis passing through axially inner location 14 such that smooth driving rotation may be provided to outer stem 12 while wheel assembly 10 is pivoted by steering knuckle 48.

In order to axially secure hub 16 relative to bearing 50, engagement ring 64 and inboard retainer 66 are located on and fastened to inboard portion 36 of hub 16. Engagement ring 64 includes a radially inner set of splines 68 which coordinate with radially outer splines 70 of hub 16. Inboard retainer 66 threadingly engages a threaded portion 72 on inner portion 36. Inboard retainer 66 is further secured and held in place by axially inner distal end 71 of hub 16 being cold formed in a radially outward direction thereby overlapping the inboard radial face 73 of inboard retainer 66. An outboard radial face 74 of inboard retainer 66 contacts an inboard radial surface 76 of engagement ring 64. The axial force created by inboard retainer 66 being threaded on threaded portion 72 of hub 16 draws an outboard shoulder surface 78 of hub 16 toward an outboard radial surface 80 of engagement ring 64. Located between shoulder 78 and surface 80 are outboard inner race 84 and inboard inner race 86 of bearing 50.

Outboard inner race 84 and inboard inner race 86 coordinate with one another and with outer race 52 such that a predetermined preload is exerted on outboard tapered roller bearing set 88 and inboard tapered roller bearing set 90. The preload does not vary after contact is made between races 84 and 86, unless retainer 66 is tightened to the point at which races 84 and 86 deform. This is unlikely to occur since the threads of retainer 66 would likely shear prior to achieving an axial force which would deform race 84 or 86. This configuration allows for a greater axial force to be applied by inboard retainer 66 then can be applied using traditional bearing sets where the bearing preload is controlled by the retention force of the retaining element. By providing an increased inboard retention force the axial run-out of the brake disc rotor 42 can be reduced.

Engagement ring 64 includes a set of radially outer teeth 92 for providing driving rotation from a set of radially outer teeth 94 on a generally inboard cylindrical portion 96 of outer stem 12. Actuator 98 is typically a vacuum actuated annular device which is connected to steering knuckle 48. When actuator 98 is activated the locking collar 100 is advanced from a disengaged position (shown in the lower portion of FIG. 1) to an engaged position (shown in the top portion of FIG. 1). In the disengaged position, locking collar 100 is aligned with teeth 94 of outer stem 12 only and freely rotates therewith. When in the engaged position, locking collar 100 interconnects teeth 94 of outer stem 12 with teeth 92 of engagement ring 64 thereby locking engagement ring 64 into rotation with outer stem 12. The rotational driving force produced by outer stem 12 upon engagement ring 64 is communicated to hub 16 by way of splines 68 of ring 64 engaging splines 70 of hub 16. Driving force is thereby provided to the wheel (not shown) mounted to wheel mounting flange 40 by way of wheel mounting studs 46.

Figure 2:
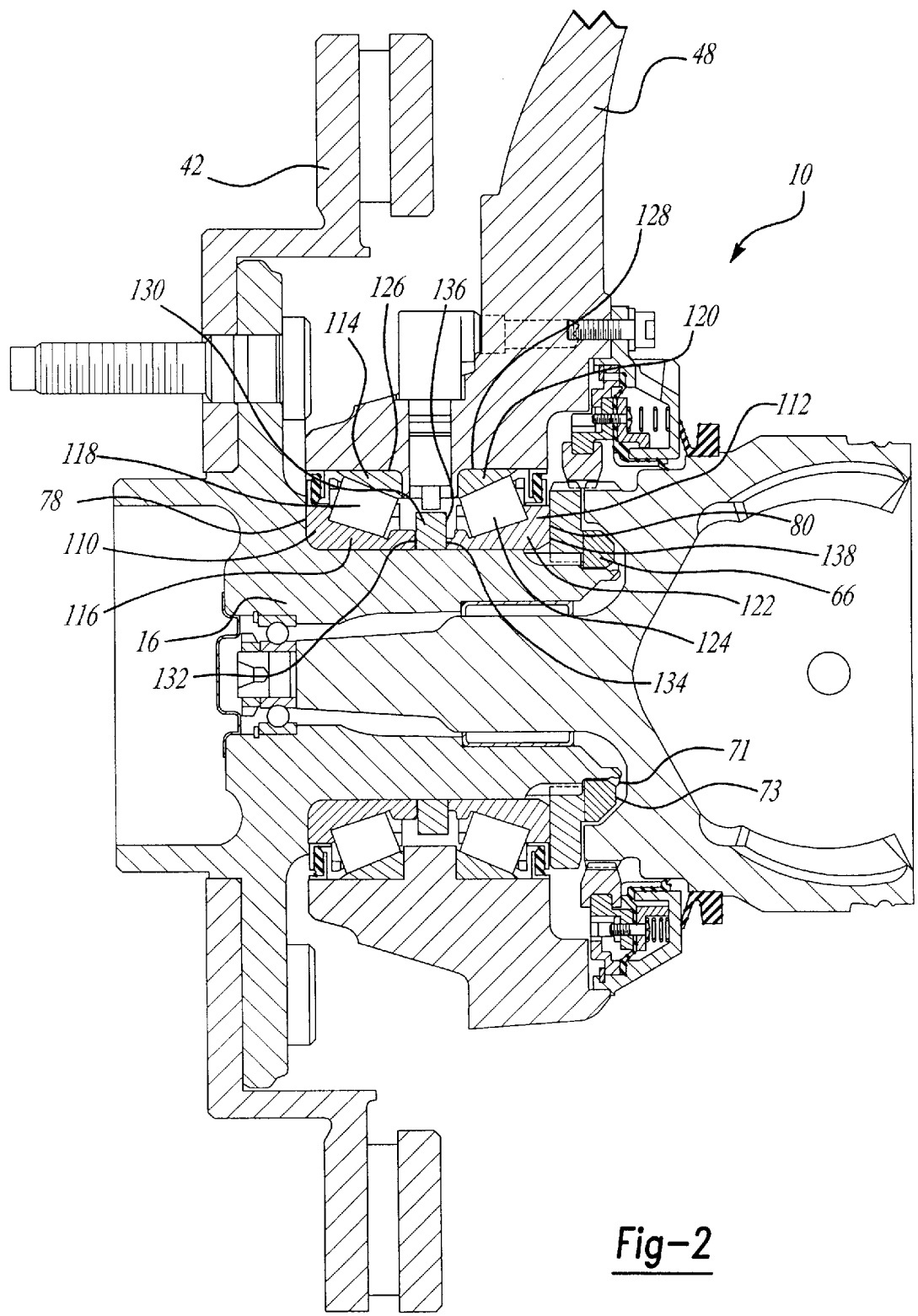
FIG. 2 is a vertical cross-section through a second preferred embodiment of a wheel assembly made in accordance with the teachings of the present invention.

Referring to FIG. 2, there is shown a second preferred embodiment of vehicle wheel assembly 10. The second preferred embodiment utilizes a set of loose bearings 110 and 112 in place of unit or flange bearing 50 in the first embodiment. Outboard hub bearing 110 includes outer race 114, inner race 116, and outboard roller bearing set 118. Inboard hub bearing 112 includes outer race 120, inner race 122, and inboard roller bearing set 124.

Outboard outer race 114 and inboard outer race 120 are each press-fit into shoulders 126 and 128 formed in steering knuckle 48. Outboard inner race 116 is press-fit over hub 16 and rests against outboard shoulder surface 78, roller bearing set 118 being positioned between inner race 116 and outer race 114. A tone ring 130 is press-fit on hub 16 and is positioned against an inboard edge 132 of inner race 116. Inboard inner race 122 is press-fit over hub 16 such that an outboard edge 134 rests against an inboard radial surface 136 of tone ring 130. Inboard roller bearing set 124 being positioned between outer race 120 and inner race 122. Outboard radial surface 80 of engagement ring 64 contacts an inboard radial surface 138 of inner race 122 as shown. As in the prior embodiment, the distance between shoulder 78 and outboard radial surface 80 of engagement ring 64 is controlled by inner race 116, tone ring 130, and inner race 122 coordinating with one another such that the distance, and in affect the preload, does not vary after contact is made between the elements unless retainer 66 is tightened to the point at which one of the components deforms. Again, this configuration allows for a greater axial force to be applied to inboard retainer 66 then can be applied using traditional bearing sets where the bearing preload is controlled by the retention force of the retaining element. By providing an increased inboard retention force axial run-out of the brake disc rotor 42 can be reduced. As in the prior embodiment, inboard retainer 66 is further secured and held in place by axially inner distal end 71 of hub 16 being cold formed in a radially outward direction thereby overlapping the inboard radial surface 73 of inboard retainer 66.

Figure 3:
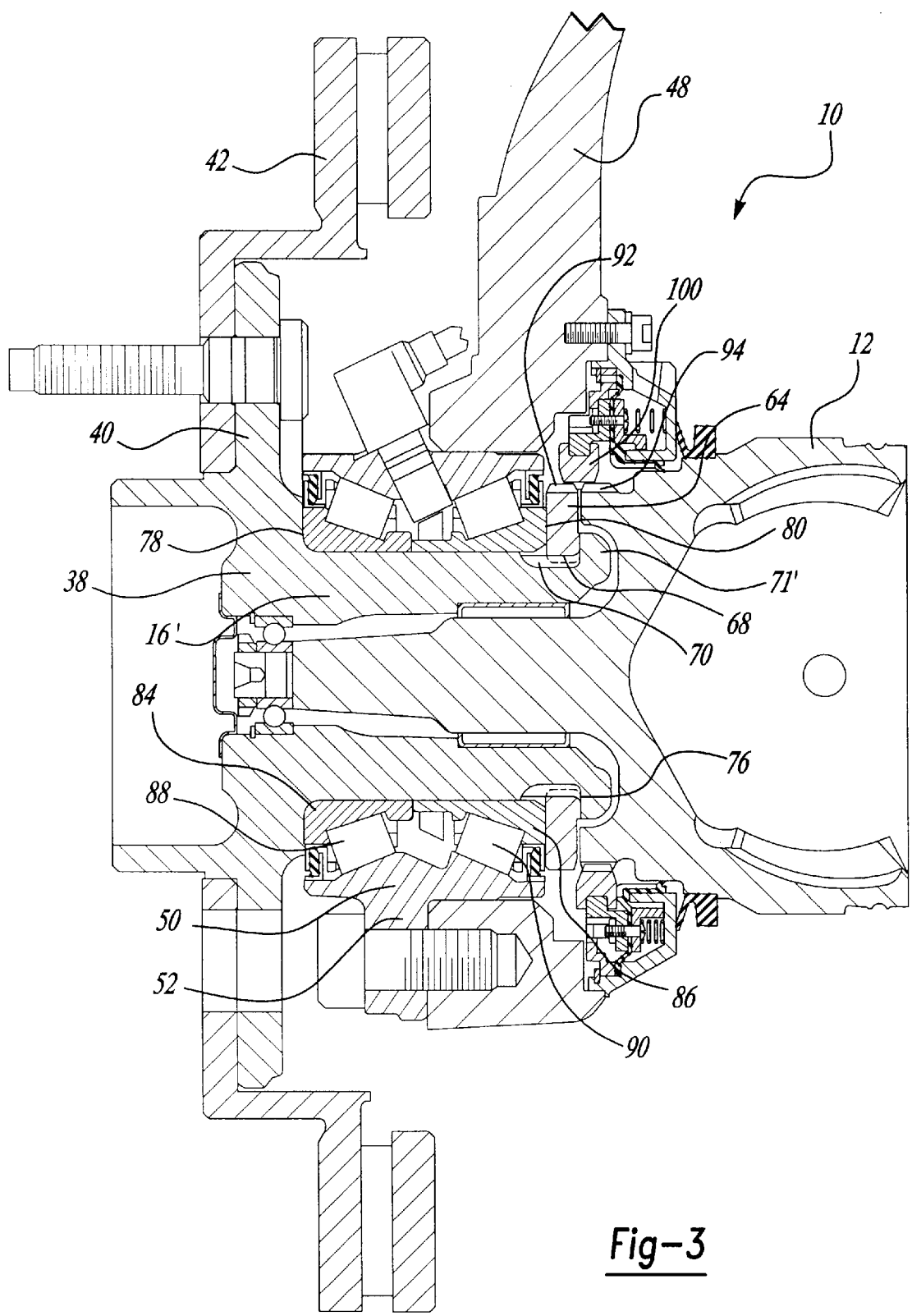
FIG. 3 is a vertical cross-section through a third preferred embodiment of a wheel assembly made in accordance with the teachings of the present invention.

A third preferred embodiment of the present invention is shown in FIG. 3. While the third embodiment is shown to incorporate a unit or flange bearing 50 it will be recognized by those skilled in the art that loose bearings, similar to bearings 110 and 112 described in relation to the second preferred embodiment and shown in FIG. 2, can be utilized with equal result. As shown in the third preferred embodiment engagement ring 64 is rotationally positioned by splines 68 on ring 64 engaging splines 70 on hub 16'. The axial retention of engagement ring 64 in the present embodiment is accomplished by cold forming an axial inner distal end 71' of hub 16' in a radially outward direction which overlaps the inboard radial surface 76 of ring 64. Distal end 71' is of sufficient structural integrity when deformed to exert an axial compressive force sufficient to draw outboard shoulder surface 78 of hub 16' toward an outboard radial surface 80 of engagement ring 64.

Figure 4:
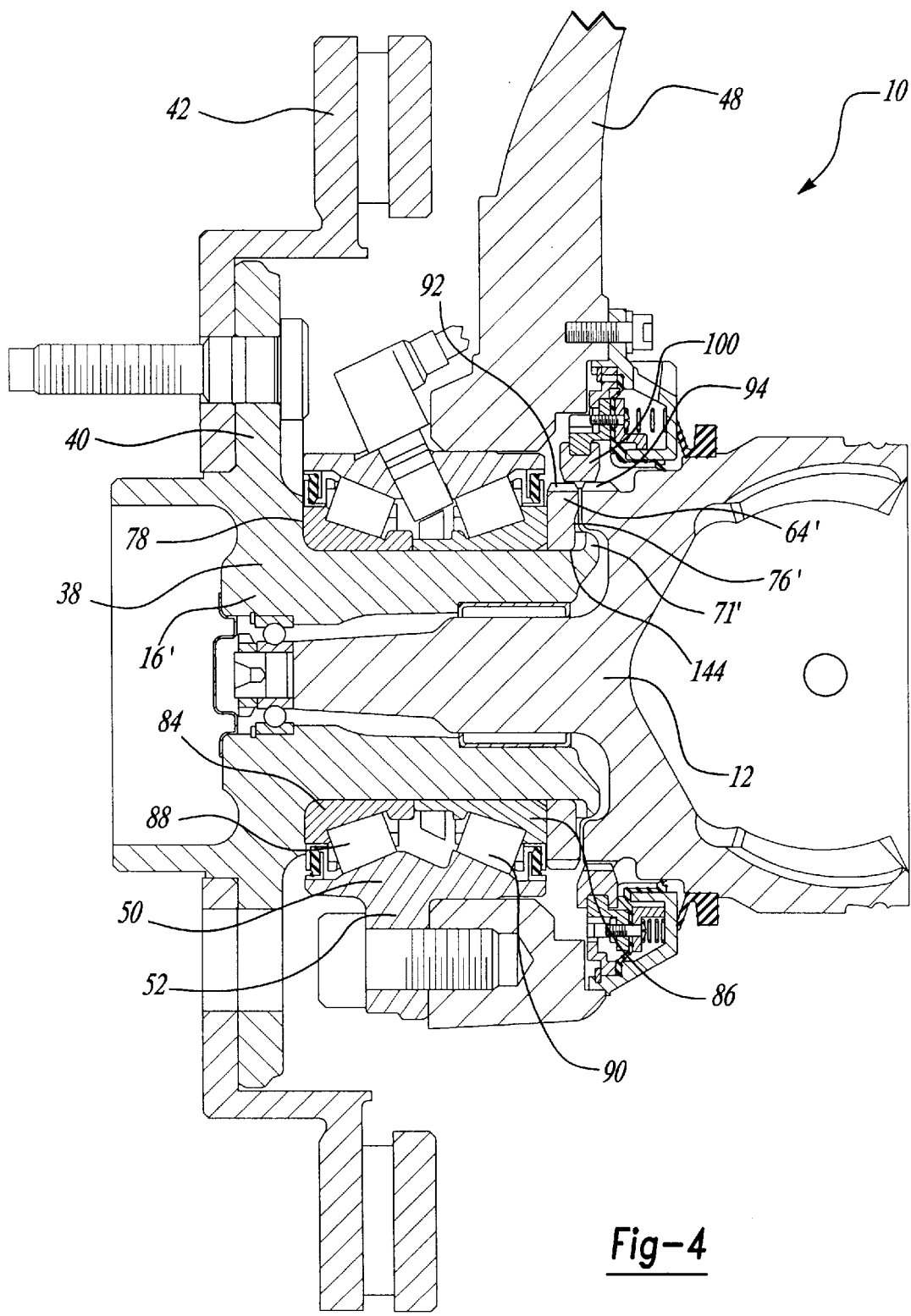
FIG. 4 is a vertical cross section through a fourth preferred embodiment of a wheel assembly made in accordance with the teachings of the present invention.

With reference now to FIGS. 4 and 5, a fourth preferred embodiment of the present invention is shown. While the fourth embodiment is shown to incorporate a unit or flange bearing 50 it will be recognized by those skilled in the art that loose bearings, similar to bearings 110 and 112 described in relation to the second preferred embodiment and shown in FIG. 2, can be utilized with equal result. In the fourth preferred embodiment, the outer radial surface 144 of hub 16' does not include any splines to rotationally position engagement ring 64' relative to hub 16'. Instead, inboard radial surface 76' of engagement ring 64' includes depressions 146 into which distal end 71' is formed during the cold forming process. The axial faces 148 and 150 of depressions 146 rotationally position engagement ring 64' relative to hub 16'. Faces 148 and 150 also allow for the rotational driving torque, provided to engagement ring 64' from outer stem 12 by way of collar 100, to be transferred from engagement ring 64' to hub 16'.

During driving rotation in a first direction, axial face 148 transfers the rotational driving forces from engagement ring 64' to hub 16', while axial face 150 provides the driving rotational force from engagement ring 64' to hub 16' in a second rotational direction. It will be readily recognized by those skilled in the art that depressions 146 can take a wide variety of shapes or forms. Further, it will be recognized by one skilled in the art that raised surfaces or radially extending ribs on inboard radial surface 76' could be used in place of depressions 146 with equal effect.

A fifth preferred embodiment of the present invention is shown in FIG. 6. While the fifth embodiment is shown to incorporate a unit or flange bearing 50 it will be recognized by those skilled in the art that loose bearings, similar to bearings 110 and 112 described in relation to the second preferred embodiment and shown in FIG. 2, can be utilized with equal result. As shown, the radially outer surface of hub 16" includes splines 70 which mate with radially inner splines 68 of engagement ring 64". Further, engagement ring 64" includes depressions 146' on its inboard radial surface 76" (as shown previously in FIG. 5 as 146 and 76'). In the present embodiment, the rotational driving force provided to engagement ring 64" is transferred to hub 16" by both the engagement of splines 68 and 70 and distal end 71" acting on axial faces 148' and 150' (as shown previously in FIG. 5 as 148 and 150).

The foregoing discussion discloses and describes several preferred embodiments of the present invention. One skilled in the art will recognize from such discussion, and from the accompanying drawings and claims, that various changes, modifications, and variations can be made therein without departing from the true spirit and fair scope of the invention as defined in the following claims.

What is claimed is:

1. A wheel assembly for a vehicle, said wheel assembly being connected to the suspension system of the vehicle which has an actuator for selectively engaging a locking collar such that rotational driving forces are selectively provided to a wheel of the vehicle, said wheel assembly comprising:

a steering knuckle attached to said suspension system of said vehicle;

a hub journally supported within said steering knuckle, said hub having an inboard portion and an outboard portion, said outboard portion having a shoulder surface thereon;

hub bearings supporting said hub for rotation relative to said steering knuckle, said hub bearings having at least one outer race and at least one inner race;

an outer stem selectively providing rotational driving forces;

stem bearings journally supporting said outer stem within said hub for selective rotation relative to said hub;

an engagement ring secured to said inboard portion of said hub, said engagement ring having a set of radially inner splines coordinated with and engaging a set of radially outer splines on said inboard portion of said hub, thereby providing for the transmission of rotational driving forces from said engagement ring to said hub; and means for retaining said engagement ring by engaging an inboard radial surface of said engagement ring, wherein an outboard radial surface of said engagement ring transfers an axial force created by said means for retaining to said inner race thereby forcing said inner race into engagement with said shoulder surface of said hub, said hub being thereby retained within said wheel assembly, said force generating a preload on said hub bearings, said preload being substantially independent of additional axial forces exerted by said retaining means.

2. The wheel assembly of claim 1 wherein said retaining means includes a retainer which threadingly engages a threaded portion on said inner portion of said hub.

3. The wheel assembly of claim 2 wherein said retainer is further secured to said hub by forming an axially inner distal end of said hub in a radially outward direction thereby overlapping at least a portion of said inboard radial surface of said retainer.

4. The wheel assembly of claim 1 wherein said engagement ring is axially retained by forming an axially inner distal end of said hub in a radially outward direction thereby overlapping at least a portion of said inboard radial surface of said retaining means.

5. A wheel assembly for a vehicle, said wheel assembly being connected to the suspension system of the vehicle which has an actuator for selectively engaging a locking collar such that rotational driving forces are selectively provided to a wheel of the vehicle, said wheel assembly comprising:

a steering knuckle attached to said suspension system of said vehicle;

a hub journally supported within said steering knuckle, said hub having an inboard portion and an outboard portion, said outboard portion having a shoulder surface thereon;

hub bearings supporting said hub for rotation relative to said steering knuckle, said hub bearings having at least one outer race and at least one inner race;

an outer stem selectively providing rotational driving forces;

stem bearings journally supporting said outer stem within said hub for selective rotation relative to said hub;

an engagement ring secured to said inboard portion of said hub, said engagement ring having radially extending, axial deformations on an axially inner face into which an axially inner distal end of said hub is formed in a radially outward direction thereby overlapping at least a portion of said axially inner face of said engagement ring; and means for retaining said engagement ring by engaging an inboard radial surface of said engagement ring, wherein an outboard radial surface of said engagement ring transfers an axial force created by said means for retaining to said inner race thereby forcing said inner race into engagement with said shoulder surface of said hub, said hub being thereby retained within said wheel assembly, said force generating a preload on said hub bearings, said preload being substantially independent of additional axial forces exerted by said retaining means.

6. The wheel assembly of claim 5 wherein said engagement ring includes a set of radially inner splines coordinated with and engaging a set of radially outer splines on said inboard portion of said hub, thereby providing for the transmission of rotational driving forces from said engagement ring to said hub.

7. The wheel assembly of claim 1 having two inner races.

8. The wheel assembly of claim 5 having two outer races.

9. A wheel assembly for a vehicle, said wheel assembly being connected to the suspension system of the vehicle and having an actuator for selectively engaging a locking collar such that rotational driving forces are selectively provided to a wheel of the vehicle, said wheel assembly comprising:

a steering knuckle attached to said suspension system of said vehicle;

a hub journally supported within said steering knuckle, said hub having an inboard portion and an outboard portion, said outboard portion having a shoulder surface thereon;

an inboard hub bearing having an outer race and an inner race;

an outboard hub bearing having an outer race and an inner race, said inboard hub bearing and said outboard hub bearing supporting said hub for rotation relative to said steering knuckle;

an outer stem selectively providing rotational driving forces;

stem bearings journally supporting said outer stem within said hub for selective rotation relative to said hub;

an engagement ring secured to said inboard portion of said hub, said engagement ring having a set of radially inner splines coordinated with and engaging a set of radially outer splines on said inboard portion of said hub, thereby providing for the transmission of rotational driving forces from said engagement ring to said hub; and means for retaining said engagement ring by engaging an inboard radial surface of said engagement ring, wherein an outboard radial surface of said engagement ring transfers an axial force created by said means for retaining to said inboard inner race which acts to force said outboard inner race into engagement with said shoulder surface of said hub, thereby retaining said hub within said wheel assembly and generating a preload on said hub bearings, said preload being substantially independent of additional axial forces exerted by said retaining means.

10. The wheel assembly of claim 9 further including a tone ring positioned between said inboard hub bearing and said outboard hub bearing, wherein said inboard inner race acts to force said tone ring into engagement with said outboard inner race which engages said shoulder surface of said hub.

11. The wheel assembly of claim 9 wherein said retaining means includes a retainer which threadingly engages a threaded portion on said inner portion of said hub.

12. The wheel assembly of claim 11 wherein said retainer is further secured to said hub by forming an axially inner distal end of said hub in a radially outward direction thereby overlapping at least a portion of said inboard radial surface of said retainer.

13. The wheel assembly of claim 9 wherein said engagement ring is axially retained by forming an axially inner distal end of said hub in a radially outward direction thereby overlapping at least a portion of said inboard radial surface of said retaining means.

14. A wheel assembly for a vehicle, said wheel assembly being connected to the suspension system of the vehicle and having an actuator for selectively engaging a locking collar such that rotational driving forces are selectively provided to a wheel of the vehicle, said wheel assembly comprising:

a steering knuckle attached to said suspension system of said vehicle;

a hub journally supported within said steering knuckle, said hub having an inboard portion and an outboard portion, said outboard Portion having a shoulder surface thereon;

an inboard hub bearing having an outer race and an inner race;

an outboard hub bearing having an outer race and an inner race, said inboard hub bearing and said outboard hub bearing supporting said hub for rotation relative to said steering knuckle;

an outer stem selectively providing rotational driving forces;

stem bearings journally supporting said outer stem within said hub for selective rotation relative to said hub;

an engagement ring secured to said inboard portion of said hub, said engagement ring having radially extending, axial deformations on an axially inner face into which an axially inner distal end of said hub is formed in a radially outward direction thereby overlapping at least a portion of said axially inner face of said engagement ring; and means for retaining said engagement ring by engaging an inboard radial surface of said engagement ring, wherein an outboard radial surface of said engagement ring transfers an axial force created by said means for retaining to said inboard inner race which acts to force said outboard inner race into engagement with said shoulder surface of said hub, thereby retaining said hub within said wheel assembly and generating a preload on said hub bearings, said preload being substantially independent of additional axial forces exerted by said retaining means.

15. The wheel assembly of claim 14 wherein said engagement ring includes a set of radially inner splines coordinated with and engaging a set of radially outer splines on said inboard portion of said hub, thereby providing for the transmission of rotational driving forces from said engagement ring to said hub.

* * * * *